May 16, 1961

Z. USELIS 2,983,944

CLEANING DEVICE

Filed Nov. 5, 1956

Zenonas Uselis

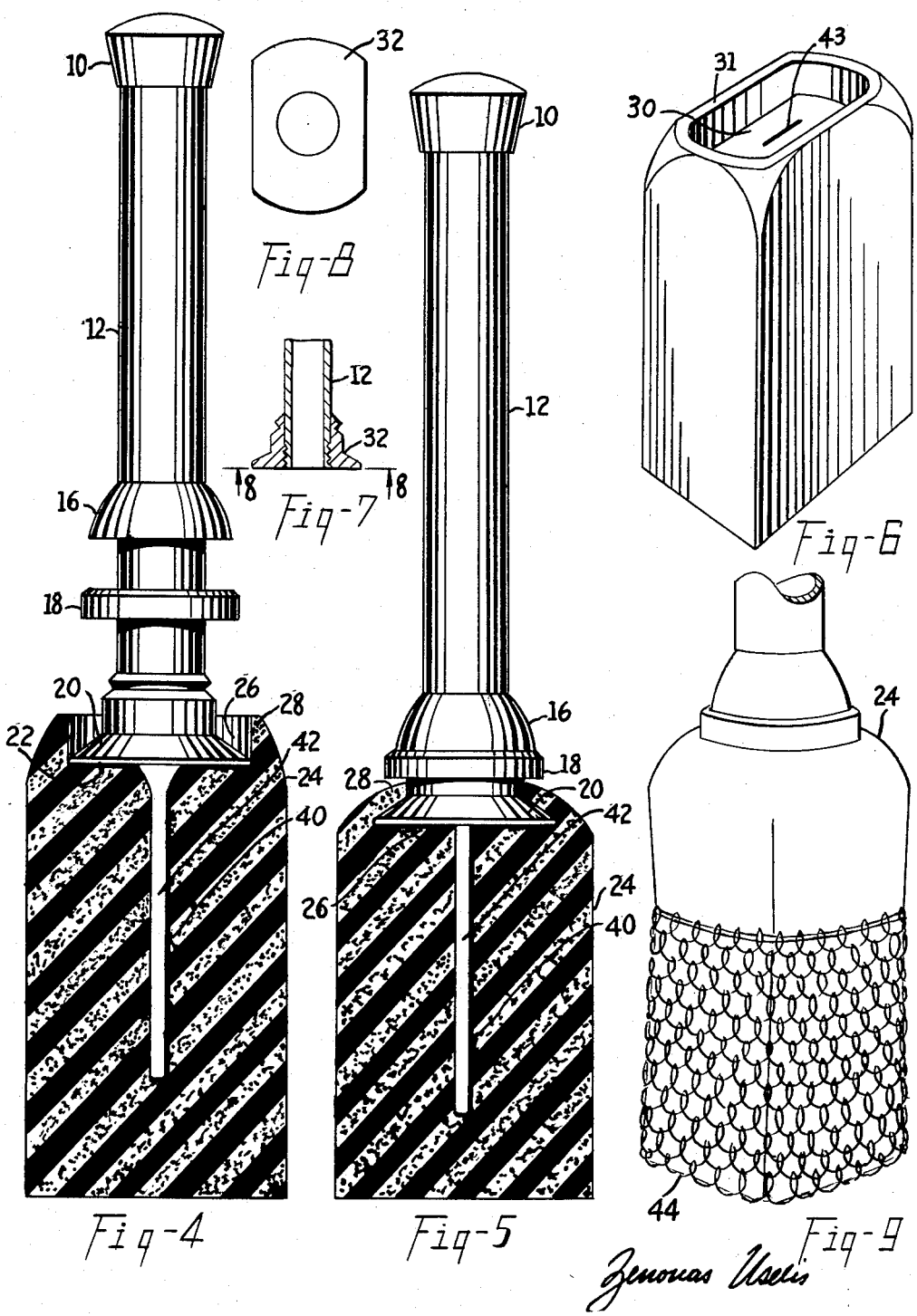

United States Patent Office 2,983,944
Patented May 16, 1961

2,983,944
CLEANING DEVICE
Zenonas Uselis, New York, N.Y.
(134—01 59th Ave., Flushing, N.Y.)
Filed Nov. 5, 1956, Ser. No. 620,353
3 Claims. (Cl. 15—244)

The present invention relates to a cleaning device, and in particular to an improved cleaning device which includes a novel handle and specially adapted cleaning sponge, the latter being fully supported when pressed against a surface being cleaned and yet capable of being fully compressed to drive out fluid contained therein.

In conventional sponge mops and other sponge cleaning devices, means are generally provided for squeezing the sponge to force out the liquids, cleaners, detergents and soaps contained therein, but generally the arrangement is such that contact by the hands of the user with substances contained in the sponge is unavoidable. Also devices conventionally used for squeezing sponges are generally provided with sharp projections, which, if care is not taken, will cause damage to surfaces being cleaned.

Accordingly, the present invention provides a cleaning device which overcomes the above disadvantages, and which includes a novel handle, an elongated shaped sponge arranged so that the sponge can be releasably clamped by the handle, and cooperating portions of the sponge and handle whereby the sponge is fully supported against distortion when the sides of the sponge are pressed against a surface to be cleaned.

With respect to the latter, the handle is comprised of an elongated tubular member having a longitudinal bore arranged within it and a reciprocating plunger having a portion slidably positioned within the bore. The sponge preferably comprises an elongated body portion and a slot extending longitudinally within the body, the slot generally conforming to the shape of the sponge. A second blade portion for the plunger is provided which is seated in said slot in the sponge and which is at least as long as the slot and of the same shape. A spring means is provided in the bore of the handle and is arranged to normally urge the plunger outwardly from the bore. To hold the sponge to the handle, the handle is provided with a laterally extending shouldered portion, and clamping means cooperating with the shouldered portion. The sponge is provided with a cavity into which said handle shouldered portion seats and a rim about said cavity onto which said handle clamping means and shouldered portion are adapted to clamp. While the plunger is urged outwardly, it imparts lateral rigidity to the sponge member and maintains the sponge substantially rigidly against distortion when the sponge is used to clean a surface, but by virtue of the elongation of the sponge member, the ability of the blade portion to be displaced to within the handle, and the manner in which the sponge is clamped to the handle, the sponge may be pressed against a surface to force the plunger against the action of the spring permitting the sponge to be evenly and fully compressed for forcefully driving out any fluid contained therein.

A number of modifications are possible. The particular arrangement, shape and orientation of the component parts may be varied, depending upon the use contemplated for the sponge. For instance, the concepts of the invention may be readily adapted to form a sponge especially designed for cleaning tables, doors, window sills, refrigerators, cars, cups, glasses, dishes, pots and pans, and other specially formed surface. It may be arranged as a small hand mop, or it may be arranged as a floor mop for larger surfaces. Also it can be used as a small wiping device for cleaning pots and pans in the sink. Similarly, a scrub net or like means may be placed over the sponge, or other abrasive means, to provide an effective cleaning tool.

Other arrangements and advantages will become apparent upon further consideration of the specification and accompanying drawings; in which Figure 1, is a perspective view of an assembled cleaning device according to the invention;

Figures 4 and 5, illustrate the manner in which the sponge is attached to the handle according to the invention;

Figure 6 is an illustration of a specially formed sponge incorporating the concepts of the invention;

Figure 7 illustrates a modification in the sponge handle according to the invention;

Figure 8 is a view along line 8—8 of Figure 7; and

Figure 9 illustrates a scrub-net which is shown as slipped over the sponge.

Figure 1:
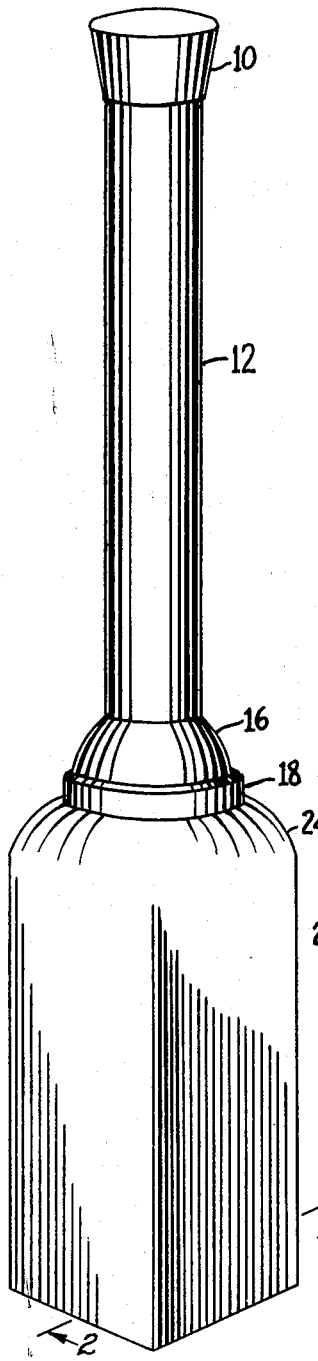
Figure 2:
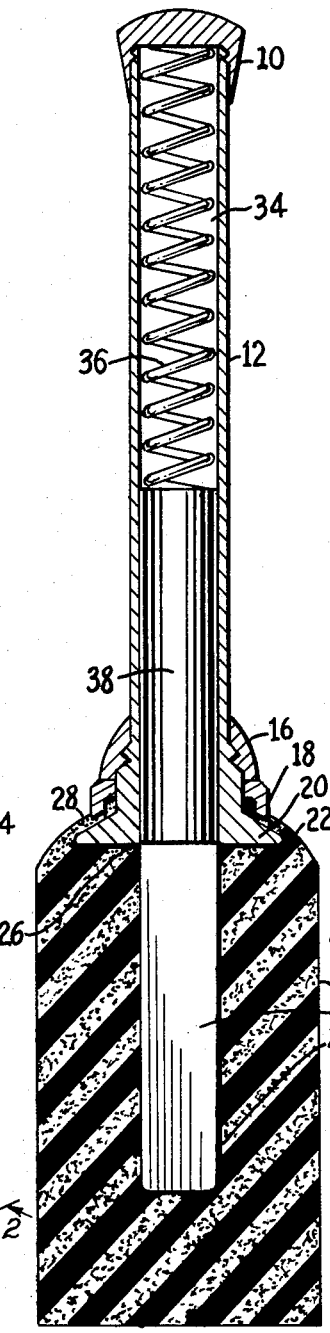
Figure 2, is a cross-sectional view taken along line 2—2 of Figure 1.

Referring to Figures 1 and 2, there is illustrated a cleaning device according to the present invention comprising a handle cap 10, an elongated handle tube 12 on which the cap 10 is placed, a sponge fastening lock member 16 and a fastening ring 18. At the base of the tube 12, shouldered portion 20 is provided, extending laterally from the base of the tube and having a flat bottom surface 22 which is flush with the bottom of the tube.

Details of the sponge are illustrated in Figures 1 and 2 showing a sponge body portion 24 formed with a cavity 26 surrounded by upwardly extending rim portion 28. The cavity 26 is shaped to receive the shouldered portion 20 which, in this instance, is circular, and by merely bending the rim portion 28 of the sponge inwardly to overlie the upper surface of the shouldered portion 20, the sponge may then be firmly clamped to the handle by bringing down the fastening ring 18 to bear on the rim portion as shown, and by locking the fastening ring in place with the lock member 16.

In Figures 1–5 inclusive, the shouldered portion 20 of the handle is circular in shape fitting into a circular cavity 26 of the sponge. This can readily be varied for various shapes depending on the use intended. In Figures 6, a brick shaped sponge is illustrated having a substantially rectangular cavity 30 and rim 31, and for this sponge an oblong substantially rectangular shaped shouldered member 32, shown in Figure 8, is used. To adapt a single handle for a multiple number of differently shaped sponges, a multiple number of differently shaped shouldered members 32 may be provided and arranged to be releasably attached to the handle by being threaded thereon, as shown in Figure 7 or in any other comparable manner. Similarly, a multiple number of fastening rings 18 and lock members 16 may be provided with shapes complementary with those of the shouldered members provided, and can be merely slipped onto the handle before the shouldered members are screwed on.

The handle tube 12 as illustrated in Figure 2, is hollow with a central bore 34 into which a conventional coil spring 36 is inserted and seated against the cap 10. Slidable within the bore is a rigid plunger 38 which is arranged so that it is urged in an outwardly direction by the spring 36. The sponge is formed with an elongated central slot 40 into which a blade portion 42 of the plunger 38 is inserted. The blade 42 is formed of a rigid material, for instance a rigid plastic, and is arranged within the sponge to hold the sponge rigidly against a transverse pressure applied to the sides of the sponge. In the embodiment illustrated in the drawings, the sides of the sponge may be used for cleaning or wiping of surfaces, and it is apparent that the blade 42, as arranged, prevents bending of the sponge by transverse forces exerted by the cleaning or wiping action.

Figures 4 and 5 show the cleaning device turned 90° as compared to the cleaning device as shown in Figure 2, and illustrate the substantially rectangular cross-sectional configuration of the blade and the blade securing slot in the sponge. Note in Figure 6 the position, orientation, and shape of the blade receiving slot, here designated by the numeral 43.

Figure 3:
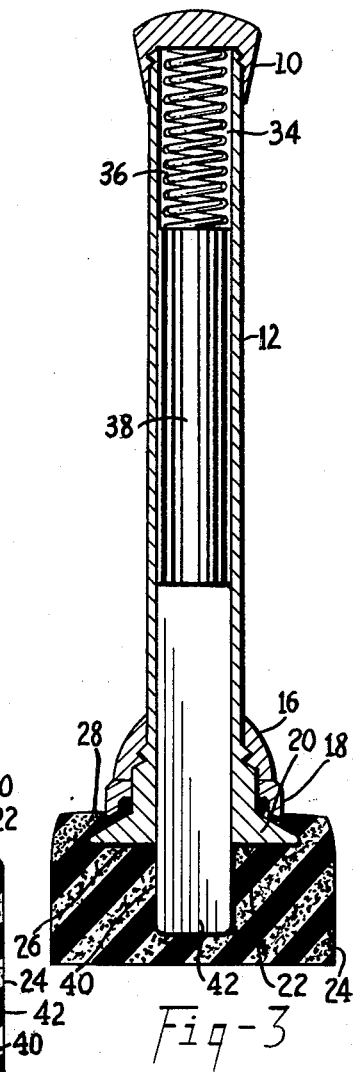
Figure 3 is a cross-sectional view of the cleaning device of Figure 2, showing the sponge in a compressed position.

Referring to Figure 3, the cleaning device is shown with the sponge body 24 compressed, and the plunger 38 forced upwardly into the bore 34 of the handle 12 against the action of spring 36. This is accomplished by merely pressing the cleaning device downwardly so that upward forces are exerted against the bottom of the sponge. By virtue of the manner in which the plunger and the blade are arranged and the manner in which the sponge is clamped to the handle, it is apparent that the sponge can be completely compressed in a smooth, even manner to forcefully drive out any fluid contained therein. By pressing the bottom end of the sponge member into a pail of water in a reciprocating manner, the sponge can be readily washed and cleaned. It might be noted in this respect that the bottom surface 22 of the shouldered portion 20 of the handle provides an effective flat area against which the sponge may be compressed. The shouldered portion is preferably as small as possible, depending on the use contemplated, but should be large enough to provide sufficient surface for proper squeezing of the sponge.

It is preferred that the blade 42 be at least as long as the slot in the sponge, and that the pressure of the spring be arranged to urge the blade against the lower portion of the slot to stretch or elongate the sponge somewhat.

The manner in which the sponge is tightly clamped to the handle and the manner in which the blade portion of the plunger 38 is urged by spring means 34 in the handle so that the blade stays continuously in the slot 40 of the sponge prevent the sponge from being substantially twisted or disturbed in any way relative to the handle when the sponge is compressed.

The blade is adequately thick, with dull, rounded edges and can move up and down within the sponge without tearing or cutting it. Similarly, the blade and sponge are formed so that pressure of a surface on the lower portion of the sponge does not cause the blade to penetrate the sponge. The sponge is also of sufficient thickness about the blade and about the shouldered portion of the handle to prevent damage to surfaces being cleaned by portions of the handle.

The lock member 16 may be arranged so that it merely snaps into place over protuberances on the outer surface of the handle to lock the fastening ring 18 in place, or may be arranged so that it can be threaded onto the handle to provide a variable clamping pressure on the sponge rim portion 28.

The cleaning device may be modified by slipping over the sponge a scrubbing net 44 of the type illustrated in Figure 9. The scrub-net is a small net like bag made of plastic netting suitable for scrubbing. It properly fits over the sponge and is held in place merely by frictional engagement. The opening of the scrub bag may be slightly less than the diameter of the sponge to provide a better grip.

It is readily apparent that the present invention provides a sponge which is absolutely safe and can be used without fear of damage to surfaces being cleaned. Moreover, the cleaning device may be readily adapted for a variety of types of surfaces and cleaning jobs, can be easily and quickly cleaned, and is arranged so that the sponge is always firmly secured to the handle in a fashion that it is unlikely to loosen or become detached inadvertently.

Although the invention has been described with reference to a number of embodiments, it is apparent that many modifications may be made in the cleaning device, and accordingly, it is intended that the scope of the patent be limited only as defined in the following claims.

I claim:

1. In a cleaning device, the combination of a handle formed with a longitudinally extending bore therein and having a laterally extending shouldered portion at one end thereof, an elongated unitary sponge member having a cavity formed therein to receive said handle shouldered portion with portions of said sponge member overlying the same, means on said handle for clamping said sponge member portions tightly to said handle shouldered portion to secure said sponge member detachably to said handle, a slot extending longitudinally in said sponge member from said cavity therein, reciprocable plunger means mounted in said handle bore having a rigid blade portion at least as long as said slot in the sponge member and conforming to the shape thereof, and spring means in said bore normally urging said plunger means outwardly thereof to maintain said plunger means blade portion in said slot yieldably longitudinally of said bore.

2. In a handle for a cleaning device or the like, the combination of an elongated tubular handle having a laterally extending shouldered portion at one end thereof, said shouldered portion having a flat bottom and a top sloping upwardly and inwardly to a cylindrical portion having threads formed at its upper end, a retainer ring on said cylindrical portion and having downwardly extending rim portions adapted to cooperate with the top of said shouldered portion to clamp a cleaning device to said handle, a nut adapted to cooperate with said threads to secure said retainer ring in the clamping position, reciprocable plunger means in said tubular handle and having an elongated rigid blade member at the lower end thereof, and spring means in said tubular member for urging said plunger means downwardly to extend said blade member through said handle shouldered portion.

3. In a cleaning device, the combination of an elongated tubular handle having a laterally extending shouldered portion at one end thereof, said shouldered portion having a bottom bearing surface and a top sloping upwardly and inwardly to a cylindrical portion having threads formed at its upper end, an elongated unitary body of sponge material having an end surface disposed substantially perpendicularly to the direction of elongation of said body and forming a seat for said handle bottom bearing surface, said end surface being bounded by an upraised wall of said sponge material overlying the top of said handle shouldered portion, a retainer ring on said handle cylinder portion, said ring having a downturned rim adapted to clamp said sponge member upraised wall against the top of said handle shouldered portion, nut means cooperating with said threads to secure said ring in the clamped position, an elongated slot in said sponge member, said slot extending longitudinally and centrally of said sponge member from said end surface, reciprocable plunger means in said tubular handle and having at the lower end thereof an elongated rigid blade member of substantially the same shape as said slot in the sponge member and receivable therein, and spring means in said tubular member normally maintaining said blade member in said sponge member slot yieldably longitudinally of said tubular member.

References Cited in the file of this patent

UNITED STATES PATENTS

| | | |
|---|---|---|
| 663,248 | Sturgis | Dec. 4, 1900 |
| 1,071,965 | Smith | Sept. 2, 1913 |
| 1,100,367 | Gambill | June 16, 1914 |
| 1,185,760 | Berry | June 6, 1916 |
| 2,323,568 | Rogers | July 6, 1943 |
| 2,357,446 | Bendar | Sept. 5, 1944 |
| 2,547,881 | Murray | Apr. 3, 1951 |
| 2,741,787 | Palma | Apr. 17, 1956 |
| 2,744,279 | Heber | May 8, 1956 |
| 2,779,962 | Cooper | Feb. 5, 1957 |

FOREIGN PATENTS

| | | |
|---|---|---|
| 10,741 | Great Britain | of 1913 |
| 1,070,031 | France | Feb. 17, 1954 |